United States Patent Office.

HEINRICH FEDDER, OF LANCASTER, NEW YORK.

Letters Patent No. 82,212, dated September 15, 1868.

IMPROVED LINIMENT.

*The Schedule referred to in these Letters Patent and making part of the same.*

TO ALL WHOM IT MAY CONCERN:

Be it known that I, HEINRICH FEDDER, of Lancaster, in the county of Erie, and State of New York, have invented a new and improved Medicine or Liniment for the cure of felons, corns, rheumatism, sore throat, and many other painful sores; and I do hereby declare the following to be a full and correct description of the same, sufficient to enable others skilled in the art to which my invention appertains to fully understand and make the same.

I make my improved liniment as follows:

I take juniper-berries, which must be well packed and sound, and pound them in a mortar until they are well bruised into one mass, to which I add a sufficient quantity of what I call butter-oil, which is prepared as follows: Butter, made of milk from cattle, in spring, when the cattle feed on the new and fresh herbs, is placed on fire, in a small kettle, and evaporated until it is free from impurities, such as milk, water, &c. This rarefied butter is placed in glass jars or vessels, and allowed to settle in the sun, when what I call butter-oil will float on top, and can be skimmed or poured off.

To the bruised berries, I add so much of this butter-oil as will make the whole a mass so stiff that it just can be stirred. This compound is boiled over a slow fire for about a quarter of an hour, more or less, stirring it continually. It is then allowed to stand for a quarter of an hour, so as to allow the full strength to be drawn from the berries into the oil, and the mass is then poured through a sieve, the fluid being caught in a vessel. To this fluid, I add about one-third of its quantity of beech-nut oil.

I then pound another quantity of juniper-berries, and add to the mass a quantity of beech-nut oil, equal to about one-third of the fluid previously prepared. The whole I boil again over a slow fire until it begins to smoke, when it is taken off, and allowed to cool. The liniment is then ready for use.

Instead of butter-oil, I may use pure butter, but this can only be done in the spring, when what is known as grass-butter is produced. Butter-oil is much preferable. The berries I use are imported ones, as American juniper-berries are found not to contain that oily strength possessed by foreign ones.

My liniment has proved an excellent cure for many sores and complaints, such as diphtheria, rheumatism, sprains, bruises, neuralgia, scrofula, fresh and old wounds, burns, cuts, cramps, &c., and is a sure killer of corns and felons, the latter having been cured, by scattering them from the bones, within one hour.

Having thus described my invention, what I claim as new, and desire to secure by Letters Patent, is—

The liniment, made of the ingredients and in the manner substantially as herein described.

HEINRICH FEDDER.

Witnesses:
ALEX'R A. C. KLAUCKE,
SAMUEL SMITH.